(12) United States Patent
Yang et al.

(10) Patent No.: US 10,923,922 B2
(45) Date of Patent: Feb. 16, 2021

(54) ENERGY BALANCING CIRCUIT AND ENERGY BALANCING APPARATUS

(71) Applicant: HUAWEI TECHNOLOGIES CO., LTD., Guangdong (CN)

(72) Inventors: Rui Yang, Shanghai (CN); Chengbin Ma, Shanghai (CN); Xiaokang Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 16/456,157

(22) Filed: Jun. 28, 2019

(65) Prior Publication Data

US 2019/0319463 A1 Oct. 17, 2019

Related U.S. Application Data

(63) Continuation of application No. PCT/CN2017/119298, filed on Dec. 28, 2017.

(30) Foreign Application Priority Data

Dec. 30, 2016 (CN) .......................... 2016 1 1270694

(51) Int. Cl.
 *H02J 7/00* (2006.01)
 *H02J 50/12* (2016.01)
 *H02J 7/02* (2016.01)

(52) U.S. Cl.
 CPC ............ *H02J 7/0014* (2013.01); *H02J 7/025* (2013.01); *H02J 50/12* (2016.02)

(58) Field of Classification Search
 CPC .. H02J 50/10; H02J 50/12; H02J 7/025; H02J 17/00; H02J 5/005
 See application file for complete search history.

(56) References Cited

U.S. PATENT DOCUMENTS

2007/0153561 A1* 7/2007 Mickle ............... G06K 19/0707
363/170
2013/0214741 A1* 8/2013 Lee ....................... H02J 7/0021
320/134

FOREIGN PATENT DOCUMENTS

CN 101740827 A 6/2010
CN 203933085 U 11/2014
(Continued)

OTHER PUBLICATIONS

PCT International Search Report and Written Opinion issued in Application No. PCT/CN2017/119,298 dated Mar. 23, 2018, 13 pages (With English Translation).

*Primary Examiner* — David V Henze-Gongola
(74) *Attorney, Agent, or Firm* — Fish & Richardson P.C.

(57) ABSTRACT

Example energy balancing circuits and energy balancing apparatus are described. One example energy balancing circuit includes a coupling branch and a receiving branch. The coupling branch includes one sending coil and at least one receiving coil. Each receiving coil is coupled to the sending coil in an electromagnetic induction manner. The receiving branch includes at least one receiving subbranch. Each receiving coil is uniquely connected to one receiving subbranch. Each receiving subbranch includes a rectifier branch. A first receiving subbranch in the at least one receiving subbranch further includes a first boost branch connected to both a first rectifier branch and a first receiving coil. The first receiving coil is a receiving coil connected to the first receiving subbranch.

10 Claims, 7 Drawing Sheets

(56) References Cited

FOREIGN PATENT DOCUMENTS

| | | |
|---|---|---|
| CN | 104242396 A | 12/2014 |
| CN | 206272286 U | 6/2017 |
| JP | 2013179766 A | 9/2013 |

* cited by examiner

ENERGY BALANCING CIRCUIT AND ENERGY BALANCING APPARATUS

CROSS-REFERENCE TO RELATED APPLICATIONS

This application is a continuation of International Application No. PCT/CN2017/119298, filed on Dec. 28, 2017, which claims priority to Chinese Patent Application 201611270694.6, filed on Dec. 30, 2016. The disclosures of the aforementioned applications are hereby incorporated by reference in their entireties.

TECHNICAL FIELD

Embodiments of the present invention relate to the battery field, and in particular, to an energy balancing circuit and an energy balancing apparatus.

BACKGROUND

Due to process condition limitation, there is a difference between parameters such as voltages, internal resistances, and capacities of batteries of a same type but with different specifications. In a scenario in which a battery pack consisting of a plurality of batteries connected in series, as a quantity of charging/discharging times of the battery pack is increased, aging degrees and temperatures of all batteries in the battery pack are different, and consequently terminal voltages of all the batteries are different. As a result, energy distribution among all the batteries is unbalanced, and consequently a life of the series battery pack is shortened.

In the prior art, there is a technical solution of balancing energy distribution among all the batteries in the battery pack. In the technical solution, one sending coil connected to a controlled alternating current source is used to simultaneously charge a plurality of receiving coils, and each receiving coil is connected to one battery in the series battery pack by using a rectifier, that is, energy distribution among all the batteries is balanced by simultaneously charging all the batteries in the series battery pack.

In the foregoing solution, a balancing capability (namely, a capability of balancing energy distribution among all the batteries in the battery pack) of the circuit may be usually improved by increasing an output voltage of the controlled alternating current source. However, an increase of the output voltage of the controlled alternating current source results in an increase of an output power of the controlled alternating current source. The increase of the output power of the controlled alternating current source results in an increase of a loss of the entire circuit.

SUMMARY

Embodiments of the present invention provide an energy balancing circuit and an energy balancing apparatus, so that a balancing capability of a circuit can be improved while a loss of the circuit is kept stable.

According to a first aspect, an energy balancing circuit is provided, where the energy balancing circuit includes a coupling branch and a receiving branch connected to the coupling branch. The coupling branch includes one sending coil and at least one receiving coil. Each of the at least one receiving coil is coupled to the sending coil in an electromagnetic induction manner. The receiving branch includes at least one receiving subbranch. Each receiving coil is uniquely connected to one of the at least one receiving subbranch. Each of the at least one receiving subbranch includes a rectifier branch. A first receiving subbranch in the at least one receiving subbranch further includes a first boost branch connected to both a first rectifier branch and a first receiving coil. The first rectifier branch is a rectifier branch in the first receiving subbranch. The first receiving coil is a receiving coil connected to the first receiving subbranch. The first boost branch is configured to increase a first value when there is an energy difference between a first charging/discharging device connected to the first rectifier branch and a second charging/discharging device connected to a second rectifier branch. The second rectifier branch is a rectifier branch in a second receiving subbranch. The second receiving subbranch is any receiving subbranch other than the first receiving subbranch in the at least one receiving subbranch. The first value is a ratio of a first impedance difference to a first terminal voltage difference. The first impedance difference is a difference between an impedance of the first receiving subbranch and an impedance of the second receiving subbranch. The first terminal voltage difference is a difference between an terminal voltage of the first charging/discharging device and an terminal voltage of the second charging/discharging device.

Before a charging/discharging device group is connected to the energy balancing circuit, as the charging/discharging device group is charged/discharged continuously in a process in which the charging/discharging device group is used, equivalent impedances of all charging/discharging devices are different, and consequently terminal voltages of all the charging/discharging devices are different, in other words, energy distribution among all the charging/discharging devices is unbalanced. Specifically, an terminal voltage of a charging/discharging device with a large equivalent impedance is relatively high, and the charging/discharging device has a relatively large amount of energy; and an terminal voltage of a charging/discharging device with a small equivalent impedance is relatively low, and the charging/discharging device has a relatively small amount of energy.

After the charging/discharging device group is connected to the energy balancing circuit, when the sending coil is coupled to the at least one receiving coil, if an equivalent impedance of a charging/discharging device and a receiving subbranch connected to the charging/discharging device is relatively large, the equivalent impedance of the charging/discharging device and the receiving subbranch connected to the charging/discharging device has a relatively small equivalent impedance mapped into the sending coil. According to a principle of voltage division through serial connection, a relatively low voltage is distributed, by using the sending coil, to the equivalent impedance of the charging/discharging device and the receiving subbranch connected to the charging/discharging device, so that a relatively small amount of energy is distributed to the equivalent impedance. If an equivalent impedance of a charging/discharging device and a receiving subbranch connected to the charging/discharging device is relatively small, the equivalent impedance of the charging/discharging device and the receiving subbranch connected to the charging/discharging device has a relatively large equivalent impedance mapped into the sending coil. According to a principle of voltage division through serial connection, a relatively high voltage is distributed, by using the sending coil, to the equivalent impedance of the charging/discharging device and the receiving subbranch connected to the charging/discharging device, so that a relatively large amount of energy is distributed to the equivalent impedance. It can be learned that energy obtained by a charging/discharging device is in inverse proportion to an impedance of the charging/discharging device. Therefore, a charging/discharging device with a relatively large amount of energy before connection is performed obtains a relatively small amount of energy, and a charging/discharging device with a relatively small amount of energy before connection is performed obtains a relatively large amount of energy.

As the first value is increased, a ratio of a difference, between energy of the first charging/discharging device that is obtained by using the sending coil and energy of the second charging/discharging device that is obtained by using the sending coil, to a second terminal voltage difference is also increased.

Correspondingly, a ratio of a difference, between a current flowed into the first charging/discharging device and a current flowed into the second charging/discharging device, to the second terminal voltage difference is also increased. A balancing capability of the energy balancing circuit provided in this embodiment of the present invention may be represented by using a ratio of a difference between impedances of charging/discharging devices to a difference between terminal voltages of the charging/discharging devices, or may be represented by using a ratio of a difference between input currents of charging/discharging devices to a difference between terminal voltages of the charging/discharging devices. Therefore, under the action of the first boost branch, the balancing capability of the energy balancing circuit provided in this embodiment of the present invention can be improved without adjusting an input voltage of the entire circuit. Because the input voltage is unchanged, a loss of the energy balancing circuit provided in this embodiment of the present invention can be kept stable. In conclusion, the balancing capability of the energy balancing circuit provided in this embodiment of the present invention can be improved while the loss of the circuit is kept stable.

Optionally, in a possible implementation of this embodiment of the present invention, the second receiving subbranch further includes a second boost branch connected to the second rectifier branch and a second receiving coil. The second receiving coil is a receiving coil connected to the second receiving subbranch. The second boost branch is configured to increase a second value when there is an energy difference between the second charging/discharging device and a third charging/discharging device connected to a third rectifier branch. The third rectifier branch is a rectifier branch in a third receiving subbranch. The third receiving subbranch is any receiving subbranch other than the second receiving subbranch in the at least one receiving subbranch. The second value is a ratio of a second impedance difference to a second terminal voltage difference. The second impedance difference is a difference between the impedance of the second receiving subbranch and an impedance of the third receiving subbranch. The second terminal voltage difference is a difference between the terminal voltage of the second charging/discharging device and an terminal voltage of the third charging/discharging device.

Similar to the first receiving subbranch, the second receiving subbranch includes a second boost branch, and a function of the second boost branch is the same as a function of the first boost branch. In the at least one receiving subbranch in the energy balancing circuit provided in this embodiment of the present invention, each receiving subbranch may include a boost branch, or each of some receiving subbranches may include a boost branch. This is not specifically limited in this embodiment of the present invention.

Optionally, in another possible implementation of this embodiment of the present invention, the energy balancing circuit further includes a charging/discharging device group connected to the receiving branch. The charging/discharging device group consists of at least one charging/discharging device connected in series. Each of the at least one charging/discharging device is connected to one of the at least one receiving subbranch. Each charging/discharging device is configured to input a direct current that is output by a receiving subbranch connected to the charging/discharging device.

Optionally, in another possible implementation of this embodiment of the present invention, the energy balancing circuit further includes a controlled alternating current source connected to the sending coil. The controlled alternating current source is configured to generate and output a first alternating current.

The controlled alternating current source in this embodiment of the present invention may be implemented in a plurality of manners, for example, implemented by using a full-bridge inverter and a full-bridge inversion control unit, or implemented by using a half-bridge inverter and a half-bridge inversion control unit, or implemented by using a single-phase three-level inverter and a single-phase three-level inversion control unit, or implemented by using a power amplifier and a power amplifier control unit.

Optionally, in another possible implementation of this embodiment of the present invention, the energy balancing circuit further includes a first compensation branch connected to both the controlled alternating current source and the sending coil. The first compensation branch is configured to: input the first alternating current, remove a direct current component from the first alternating current, and output, to the sending coil, the first alternating current from which the direct current component is removed.

The first compensation branch plays a role of "blocking a direct current and allowing an alternating current to pass", that is, may remove the direct current component from the first alternating current, so that the first alternating current that is input to the sending coil can be used, to a greater extent, to generate an electromagnetic wave.

The first compensation branch in this embodiment of the present invention may use an LCC circuit structure, or may use an LCCL circuit structure, or may include only a coupling capacitor. This is not specifically limited in this embodiment of the present invention. The LCC circuit structure is a circuit structure consisting of one inductor (represented by L) and two capacitors (represented by C), and a specific connection relationship needs to depend on an actual case. Likewise, the LCCL circuit structure is a circuit structure consisting of two inductors and two capacitors, and a specific connection relationship needs to depend on an actual case.

Optionally, in another possible implementation of this embodiment of the present invention, the first receiving subbranch further includes a second compensation branch connected to both the first boost branch and the first receiving coil. The second compensation branch is configured to: remove a direct current component from a second alternating current that is input by the receiving coil connected to the first receiving subbranch, and output, to the first boost branch, the second alternating current from which the direct current component is removed.

A function of the second compensation branch is similar to a function of the first compensation branch.

Optionally, in another possible implementation of this embodiment of the present invention, the second receiving subbranch further includes a third compensation branch connected to both the second boost branch and the second receiving coil. The third compensation branch is configured to: remove a direct current component from a third alternating current that is input by the receiving coil connected to the second receiving subbranch, and output, to the second boost branch, the third alternating current from which the direct current component is removed.

Optionally, in another possible implementation of this embodiment of the present invention, parameter values of all the receiving coils are the same, where all the receiving coils are coupled to the sending coil at a same coupling strength.

Optionally, in another possible implementation of this embodiment of the present invention, a parameter value of each receiving coil may be at least one of an inductance value of the receiving coil and a resistance value of a parasitic resistance of the receiving coil.

When a parameter of a receiving coil is an inductance value of the receiving coil and a parasitic resistance of the receiving coil, that parameter values of all the receiving coils are the same may be specifically implemented as follows: Inductance values of all the receiving coils are the same, and resistance values of parasitic resistances of all the receiving coils are the same.

Optionally, in another possible implementation of this embodiment of the present invention, that all the receiving coils are coupled to the sending coil at a same coupling strength means that coil types of all the receiving coils are the same, vertical distances between all the receiving coils and the sending coil are the same, and distances between each receiving coil and two adjacent receiving coils of the receiving coil are the same.

A coil type of each receiving coil and a placement location relationship between each receiving coil and the sending coil are set, so that all the receiving coils can be coupled to the sending coil at the same coupling strength.

Optionally, in another possible implementation of this embodiment of the present invention, a waveform of the first alternating current is a rectangular wave or a sine wave.

According to a second aspect, an energy balancing apparatus is provided, where the energy balancing apparatus includes the energy balancing circuit according to the first aspect and any one of the possible implementations of the first aspect.

These aspects or other aspects in the embodiments of the present invention are clearer and more comprehensible in the following descriptions.

DESCRIPTION OF EMBODIMENTS

Figure 1:
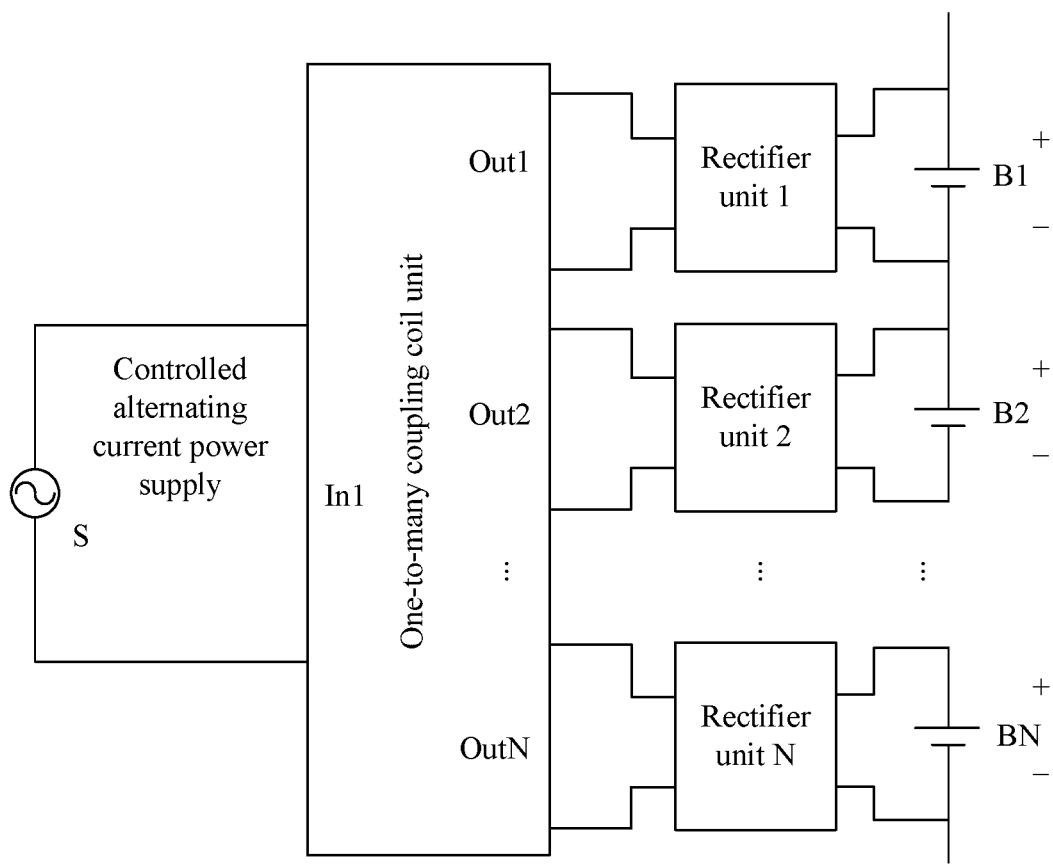
FIG. 1 is a schematic structural diagram of a balancing circuit of a wireless electric energy transmission type in the prior art.

The following describes the technical solutions in the embodiments of the present invention in detail with reference to the accompanying drawings in the embodiments of the present invention.

In the specification, claims, and accompanying drawings of the present invention, the terms "first", "second", and so on are intended to distinguish between different objects but do not limit a particular order.

The term "and/or" in the embodiments of the present invention describes only an association relationship for describing associated objects and represents that three relationships may exist. For example, A and/or B may represent the following three cases: Only A exists, both A and B exist, and only B exists.

The term such as "example" or "for example" in the embodiments of the present invention means giving an example, an illustration, or a description. Any embodiment or design scheme described as "example" or "for example" in the embodiments of the present invention should not be explained as being more preferred or having more advantages than another embodiment or design scheme. Exactly, the term such as "example" or "for example" is intended to present a concept in a specific manner.

It should be realized that, for brevity and clarity, elements shown in the accompanying drawings do not need to be drawn proportionally. For example, for clarity, sizes of some elements may be increased relative to another element. In addition, at an appropriate place, a reference numeral may be repeatedly used in the accompanying drawings, to indicate a corresponding or similar element for the problem.

For a battery pack consisting of a plurality of batteries connected in series, as the battery pack is charged/discharged continuously in a process in which the battery pack is used, aging degrees and temperatures of all batteries in the battery pack are different, and consequently terminal voltages of all the batteries are different. As a result, energy distribution among all the batteries is unbalanced, and consequently a life of the series battery pack is shortened.

In the prior art, a balancing circuit of a wireless electric energy transmission type is mainly used to balance energy distribution among all the batteries in the battery pack.

As shown in FIG. 1, the circuit includes a controlled alternating current source, a one-to-many coupling coil unit connected to the controlled alternating current source, N (N≥1) rectifier units, and a battery pack consisting of N batteries (B1, B2, . . . , and BN) connected in series. The one-to-many coupling coil unit includes one sending coil (represented by IN1 in FIG. 1) and N receiving coils (represented by $Out_1, \ldots,$ and $Out_N$ in FIG. 1). Each rectifier unit is connected to one receiving coil, and each rectifier unit is connected to one battery.

A specific principle in which the circuit is used to balance energy distribution among all the batteries is as follows: In a charging/discharging process, energy distribution among all the batteries is unbalanced, where a battery with a relatively large equivalent impedance has a relatively high terminal voltage and a relatively large amount of energy, and a battery with a relatively small equivalent resistance has a relatively low terminal voltage and a relatively small amount of energy. Under the action of the one-to-many coupling coil unit, the battery with the small equivalent resistance has a relatively large equivalent impedance mapped into the sending coil, and the battery with the large equivalent resistance has a relatively small equivalent impedance mapped into the sending coil. According to a principle of voltage division through serial connection, a relatively low voltage and a relatively small amount of energy are distributed to the battery with the large equivalent resistance by using the sending coil, and a relatively high voltage and a relatively large amount of energy are distributed to the battery with the small equivalent resistance by using the sending coil. In this way, energy distribution among the batteries is balanced.

Currently, a balancing capability of the circuit is usually improved by increasing an output voltage of the controlled alternating current source. However, an increase of the output voltage of the controlled alternating current source results in an increase of an output power of the controlled alternating current source. The increase of the output power of the controlled alternating current source results in an increase of a loss of the entire circuit.

The embodiments of the present invention provide an energy balancing circuit and an energy balancing apparatus, so that a balancing capability of a circuit can be improved while a loss of the circuit is kept stable.

The following describes in detail the energy balancing circuit provided in the embodiments of the present invention with reference to accompanying drawings.

Figure 2:
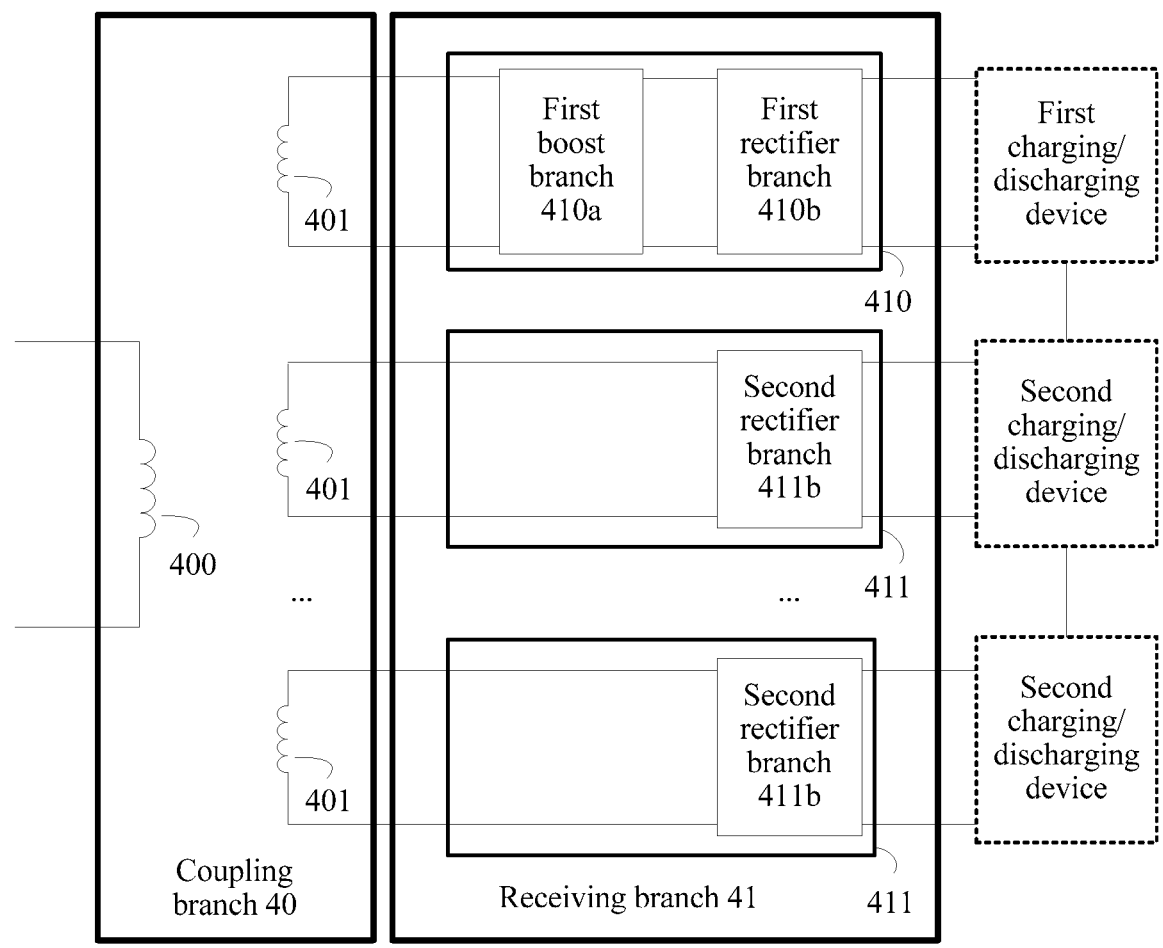
FIG. 2 is a first schematic structural diagram of an energy balancing circuit according to an embodiment of the present invention.

An embodiment of the present invention provides an energy balancing circuit. As shown in FIG. 2, the energy balancing circuit includes a coupling branch 40 and a receiving branch 41 connected to the coupling branch. The coupling branch 40 includes one sending coil 400 and at least one receiving coil. Each of the at least one receiving coil 401 is coupled to the sending coil 400 in an electromagnetic induction manner. The receiving branch 41 includes at least one receiving subbranch.

A first receiving subbranch 410 in the at least one receiving subbranch includes a first boost branch 410a connected to a first receiving coil and a first rectifier branch 410b connected to the first boost branch 410a. The first receiving coil is a receiving coil connected to the first receiving subbranch 410.

For any receiving subbranch (which is referred to as a second receiving subbranch in this embodiment of the present invention) 411 other than the first receiving subbranch 410 in the at least one receiving subbranch, the second receiving subbranch 411 includes a second rectifier branch 411b connected to a second receiving coil. The second receiving coil is a receiving coil connected to the second receiving subbranch 411.

The first boost branch 410a is configured to increase a ratio of a first impedance difference to a first terminal voltage difference (the ratio is referred to as a first value in this embodiment of the present invention) when there is an energy difference between a first charging/discharging device connected to the first rectifier branch and a second charging/discharging device connected to the second rectifier branch. The first impedance difference is a difference between an impedance of the first receiving subbranch 410 and an impedance of the second receiving subbranch 411. The first terminal voltage difference is a difference between an terminal voltage of the first charging/discharging device and an terminal voltage of the second charging/discharging device.

FIG. 2 shows a charging device in the energy balancing circuit. Therefore, in FIG. 2, dashed lines are used to represent the first charging/discharging device and the second charging/discharging device.

The first charging/discharging device and the second charging/discharging device in this embodiment of the present invention may be batteries, or may be supercapacitors, or may be other charging/discharging devices. This is not specifically limited in this embodiment of the present invention.

If the first charging/discharging device and the second charging/discharging device are batteries, the battery may be a rechargeable lithium-ion battery, or may be a rechargeable lead-acid battery, or may be a rechargeable NiMH battery. This is not specifically limited in this embodiment of the present invention.

In this embodiment of the present invention, an terminal voltage of a charging/discharging device with a large equivalent impedance is relatively high, and the charging/discharging device has a relatively large amount of energy; and an terminal voltage of a charging/discharging device with a small equivalent impedance is relatively low, and the charging/discharging device has a relatively small amount of energy. Under the coupling action of the coupling branch 40, a relatively high voltage is distributed to the charging/discharging device with the low terminal voltage by using the sending coil 400, so that a relatively large amount of energy is distributed to the charging/discharging device. A relatively low voltage is distributed to the charging/discharging device with the high terminal voltage by using the sending coil 400, so that a relatively small amount of energy is distributed to the charging/discharging device. Therefore, energy distribution among all charging/discharging devices is balanced.

It can be learned from the foregoing description that energy obtained by a charging/discharging device is in inverse proportion to an impedance of the charging/discharging device. Therefore, if the first value is larger, a balancing capability of the entire circuit is higher. Under the action of the first boost branch, the first value is increased, and a ratio of a difference, between energy of the first charging/discharging device that is obtained by using the sending coil 400 and energy of the second charging/discharging device that is obtained by using the sending coil 400, to a second terminal voltage difference is also increased. Correspondingly, a ratio of a difference, between a current flowed into the first charging/discharging device and a current flowed into the second charging/discharging device, to the second terminal voltage difference is also increased.

The balancing capability of the energy balancing circuit provided in this embodiment of the present invention may be represented by using a ratio of a difference between impedances of charging/discharging devices to a difference between terminal voltages of the charging/discharging devices, or may be represented by using a ratio of a difference between input currents of charging/discharging devices to a difference between terminal voltages of the charging/discharging devices. Therefore, under the action of the first boost branch, the balancing capability of the energy balancing circuit provided in this embodiment of the present invention can be improved without adjusting an input voltage of the entire circuit. Because the input voltage is unchanged, a loss of the energy balancing circuit provided in this embodiment of the present invention can be kept stable. In conclusion, the balancing capability of the energy balancing circuit provided in this embodiment of the present invention can be improved while the loss of the circuit is kept stable.

Figure 3:
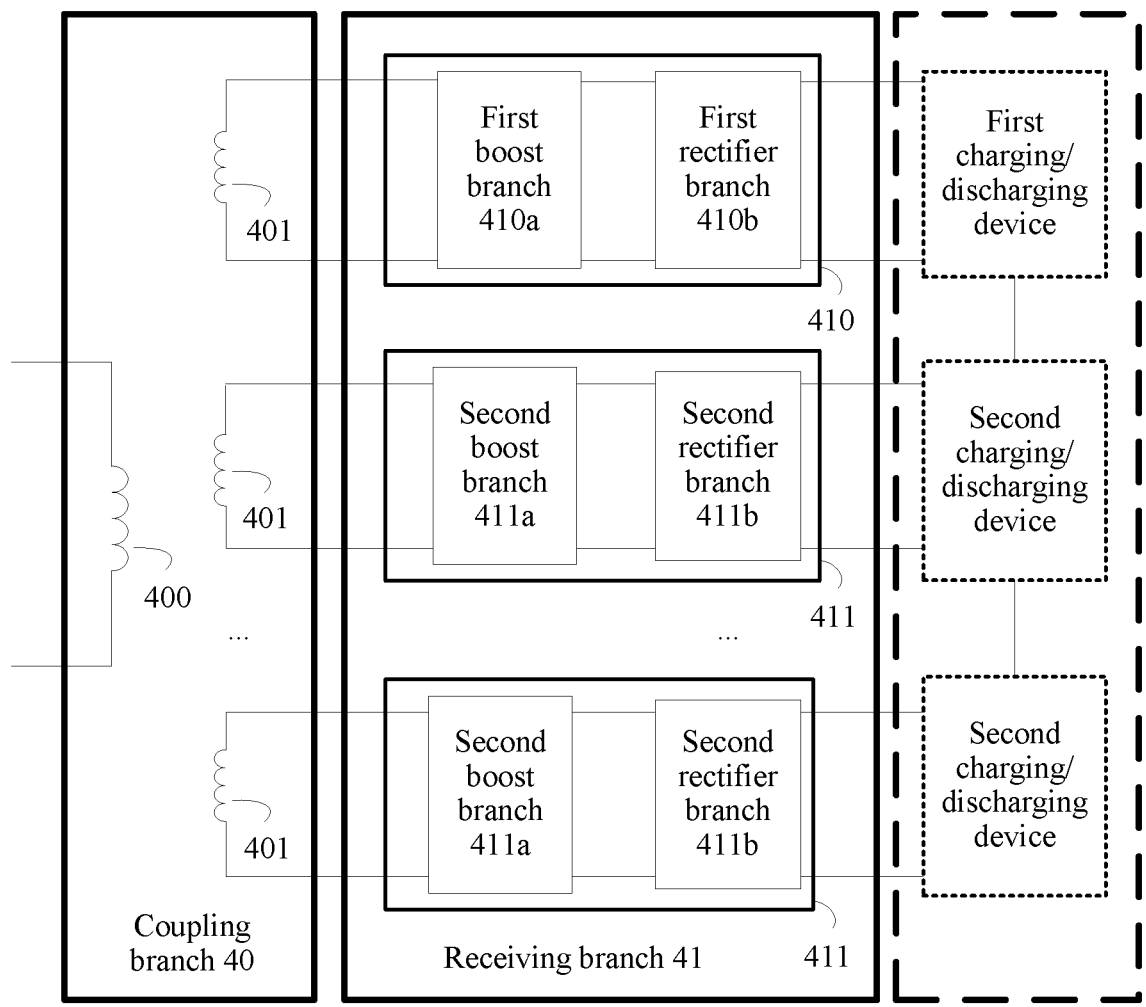
FIG. 3 is a second schematic structural diagram of an energy balancing circuit according to an embodiment of the present invention.

With reference to FIG. 2, as shown in FIG. 3, in the energy balancing circuit provided in this embodiment of the present invention, the second receiving subbranch 411 may further include a second boost branch 411a connected to both the second receiving coil and the second rectifier branch 411b.

The second boost branch 411a is configured to increase a ratio of a second impedance difference to a second terminal voltage difference (the ratio is referred to as a second value in this embodiment of the present invention) when there is an energy difference between the second charging/discharging device and a third charging/discharging device connected to a third rectifier branch in a third receiving subbranch. Herein, the third receiving subbranch is any receiving subbranch other than the second receiving subbranch in the at least one receiving subbranch. The second impedance difference is a difference between the impedance of the second receiving subbranch and an impedance of the third receiving subbranch. The second terminal voltage difference is a difference between the terminal voltage of the second charging/discharging device and an terminal voltage of the third charging/discharging device.

Figure 4:
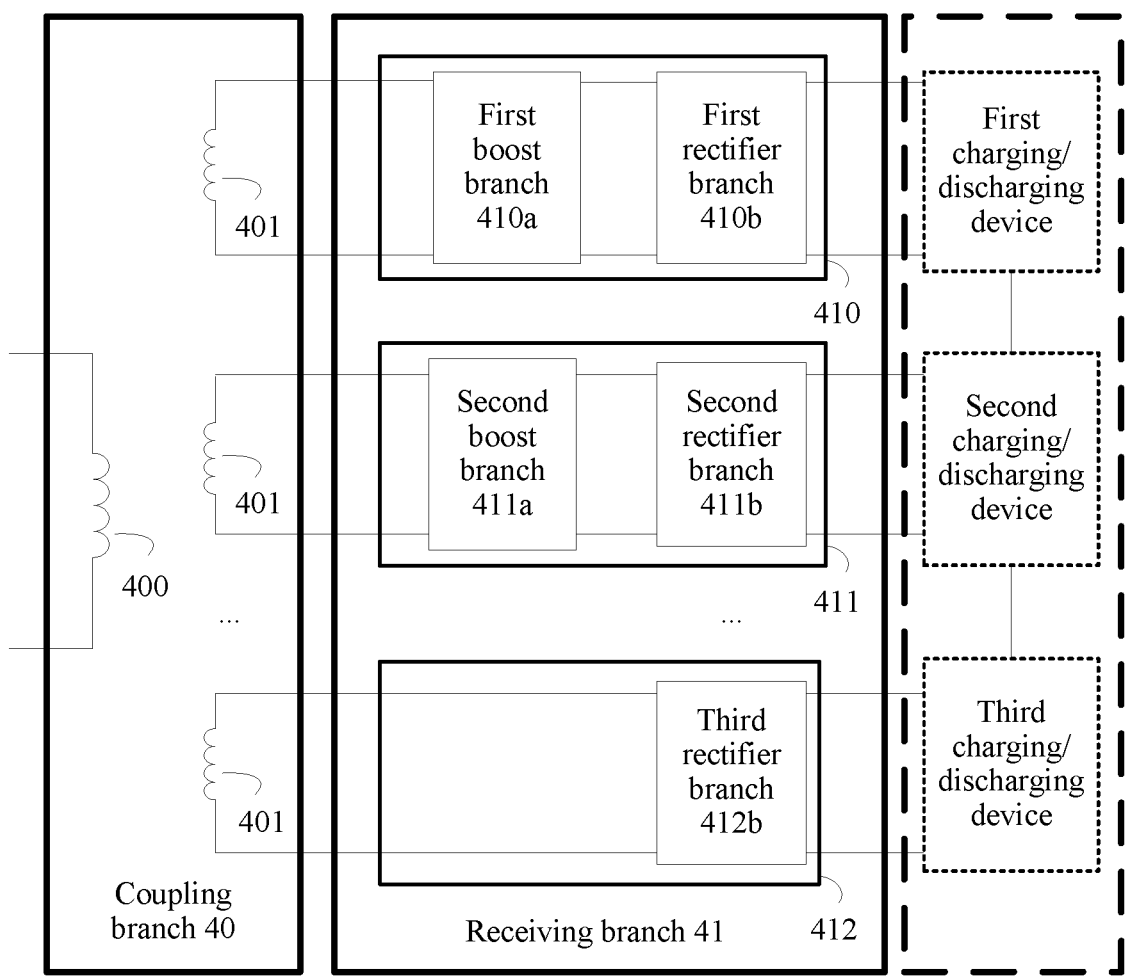
FIG. 4 is a third schematic structural diagram of an energy balancing circuit according to an embodiment of the present invention.

It should be noted that the third receiving subbranch in this embodiment of the present invention may be the first receiving subbranch 410, or may be any receiving subbranch other than the first receiving subbranch 410 and the second receiving subbranch 411 in the at least one receiving subbranch. FIG. 4 is a schematic structural diagram of the third receiving subbranch 412 in the energy balancing circuit, where the third receiving subbranch 412 is any receiving subbranch other than the first receiving subbranch 410 and the second receiving subbranch 411 in the at least one receiving subbranch. FIG. 4 is not described in detail herein.

For a function of the second boost branch 411a, refer to the description of a function of the first boost branch 410a. Details are not described herein again.

Structures of the first boost branch 410a and the second boost branch 411a may be any one of an LC impedance transformation network structure, an LCC resonant circuit structure, and an LCLC resonant circuit structure. This is not specifically limited in this embodiment of the present invention.

The LC impedance transformation network structure is a circuit structure consisting of one inductor (represented by L) and one capacitor (represented by C), and a specific connection relationship needs to depend on an actual case. Likewise, the LCC resonant circuit structure is a circuit structure consisting of one inductor and two capacitors, and a specific connection relationship needs to depend on an actual case. The LCLC resonant circuit structure is a circuit structure consisting of two inductors and two capacitors, and a specific connection relationship needs to depend on an actual case.

Figure 5:
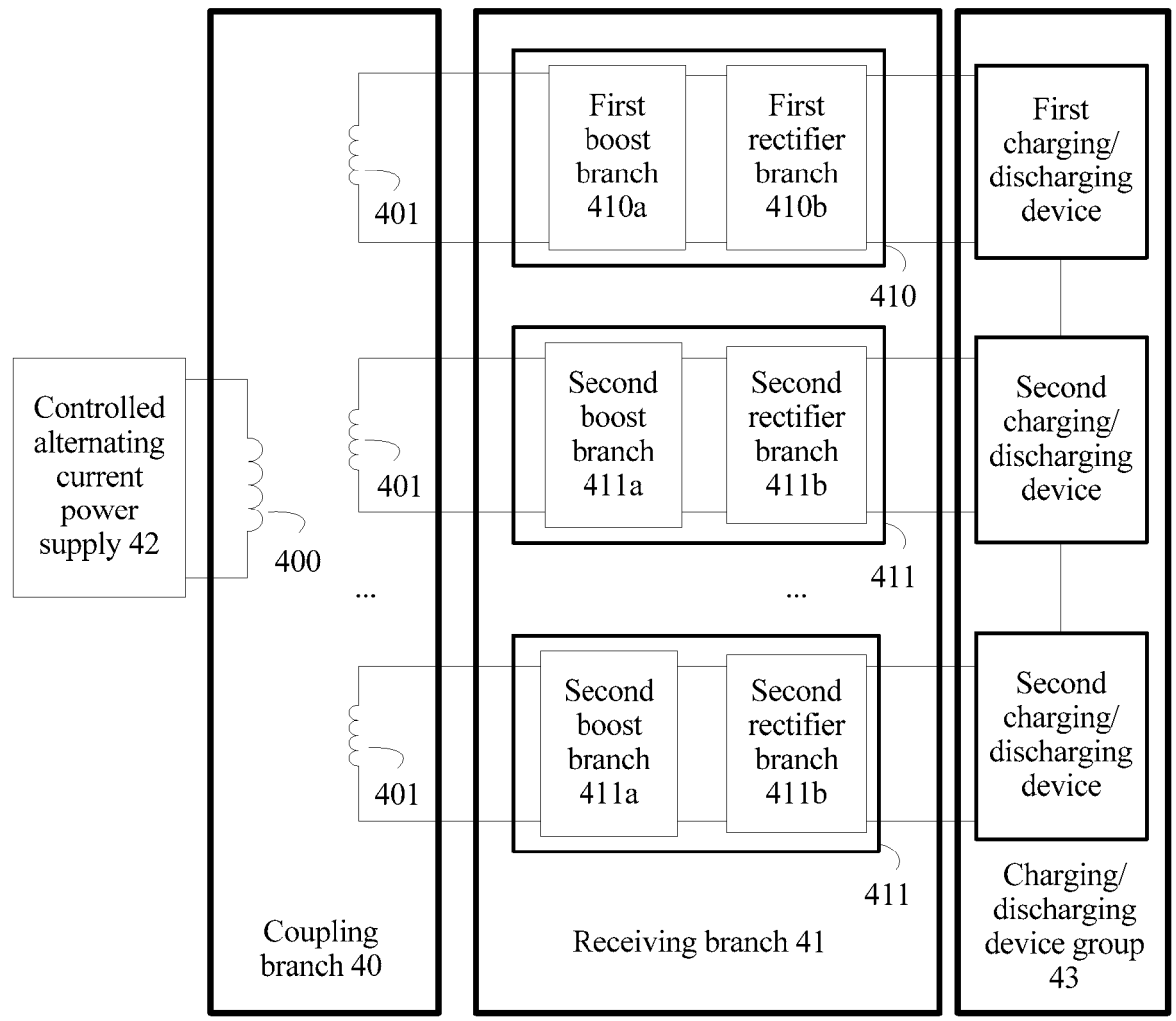
FIG. 5 is a fourth schematic structural diagram of an energy balancing circuit according to an embodiment of the present invention.

Further, with reference to FIG. 3, as shown in FIG. 5, the energy balancing circuit provided in this embodiment of the present invention further includes at least one of a controlled alternating current source 42 connected to the sending coil 400 and a charging/discharging device group 43 connected to the receiving branch 41.

The controlled alternating current source 42 is configured to generate and output a first alternating current. In this way, the sending coil 400 may send, to each receiving coil 401, an electromagnetic wave that is generated by using the first alternating current.

A waveform of the first alternating current in this embodiment of the present invention may be a rectangular wave, or may be a sine wave, or may be any other waveform. This is not specifically limited in this embodiment of the present invention.

The controlled alternating current source in this embodiment of the present invention may be implemented by using a full-bridge inverter and a full-bridge inversion control unit, or may be implemented by using a half-bridge inverter and a half-bridge inversion control unit, or may be implemented by using a single-phase three-level inverter and a single-phase three-level inversion control unit, or may be implemented by using a power amplifier and a power amplifier control unit. This is not specifically limited in this embodiment of the present invention.

Specifically, the controlled alternating current source in this embodiment of the present invention may inversely convert a direct current provided by a power supply, to generate the first alternating current. The power supply that provides the direct current may be all or some charging/discharging devices in the charging/discharging device group 43 shown in FIG. 5, or may be another charging/discharging device or charging/discharging device group. When the power supply that provides the direct current is all or some charging/discharging devices in the charging/discharging device group 43 shown in FIG. 5, energy distribution among a plurality of charging/discharging devices included in the charging/discharging device group 43 can be balanced, without connecting the charging/discharging device group 43 to another external power supply.

There may be one or more controlled alternating current sources in this embodiment of the present invention. When there are a plurality of controlled alternating current sources, the plurality of controlled alternating current sources may be connected in parallel to jointly generate the first alternating current. A current value of the first alternating current is a sum of current values of currents generated by the plurality of controlled alternating current sources.

Optionally, a switch may be disposed on a conducting wire connecting the controlled alternating current source 42 and the sending coil 400 in this embodiment of the present invention. When it is detected that energy of all charging/discharging devices is unbalanced, the switch is closed, to start balancing energy distribution among all the charging/discharging devices. When it is detected that energy of all charging/discharging devices is balanced, the switch is opened. In this way, an energy loss of the circuit can be reduced.

The charging/discharging device group 43 in FIG. 5 consists of at least one charging/discharging device connected in series. Each of the at least one charging/discharging device is connected to one of the at least one receiving subbranch. With reference to the foregoing description, the first charging/discharging device, the second charging/discharging device, and the third charging/discharging device each may be one charging/discharging device in the charging/discharging device group 43.

Each charging/discharging device is configured to input a direct current that is output by a receiving subbranch connected to the charging/discharging device.

For example, the first receiving coil outputs an alternating current to the first receiving subbranch, the alternating current is inversely converted into a direct current under the action of the first rectifier branch, and the direct current is output to the first charging/discharging device.

Figure 6:
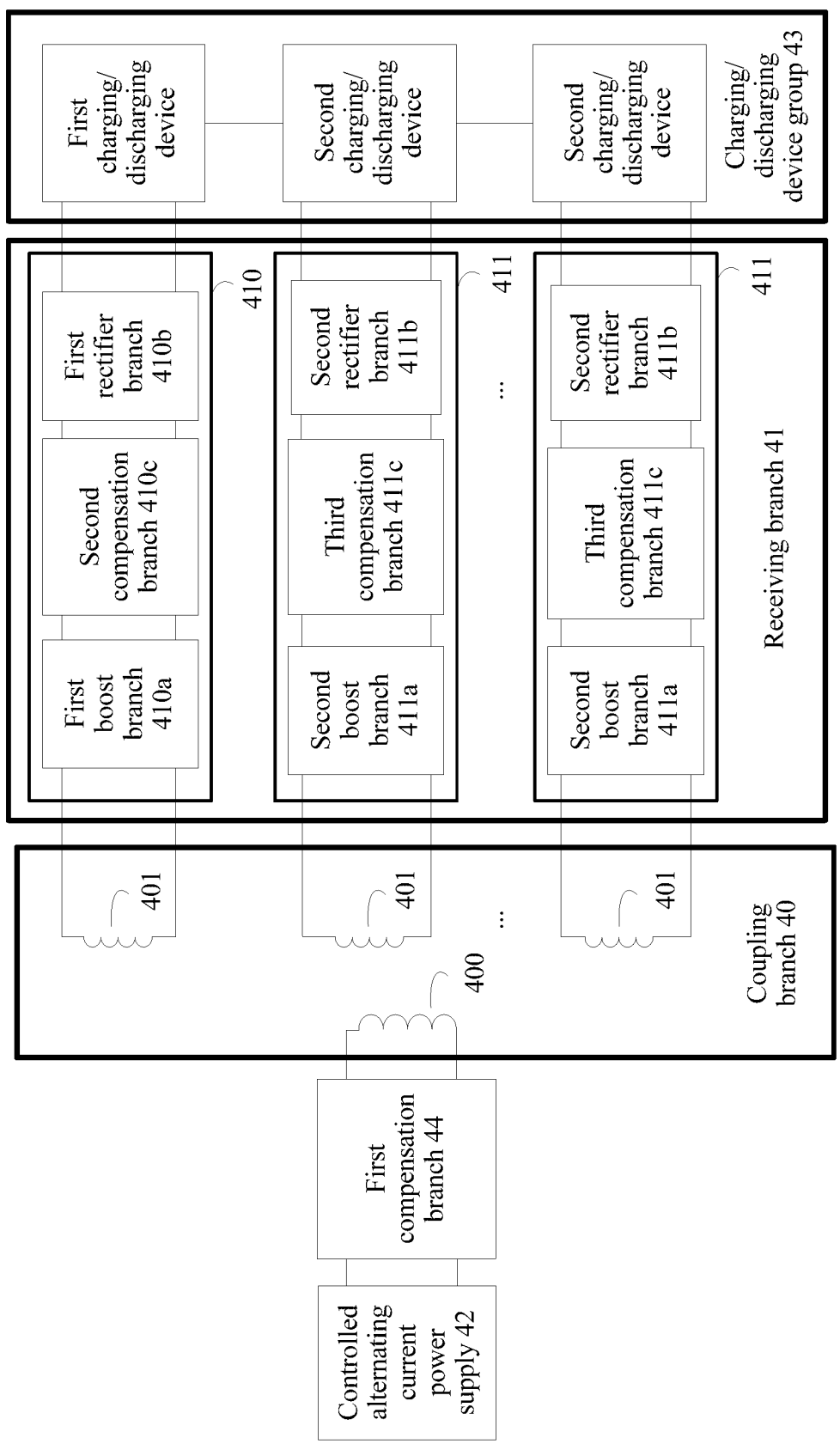
FIG. 6 is a fifth schematic structural diagram of an energy balancing circuit according to an embodiment of the present invention.

With reference to FIG. 5, as shown in FIG. 6, the energy balancing circuit provided in this embodiment of the present invention further includes a first compensation branch 44 connected to both the controlled alternating current source 42 and the sending coil 400. The first compensation branch 44 is configured to: input the first alternating current, remove a direct current component from the first alternating current, and output, to the sending coil, the first alternating current from which the direct current component is removed.

The first compensation branch 44 plays a role of "blocking a direct current and allowing an alternating current to pass", that is, the first compensation branch 44 may remove the direct current component from the first alternating current, so that the first alternating current that is input to the sending coil can be used, to a greater extent, to generate an electromagnetic wave.

The first compensation branch in this embodiment of the present invention may use an LCC circuit structure, or may use an LCCL circuit structure, or may include only a coupling capacitor. This is not specifically limited in this embodiment of the present invention. The LCC circuit structure is a circuit structure consisting of one inductor (represented by L) and two capacitors (represented by C), and a specific connection relationship needs to depend on an actual case. Likewise, the LCCL circuit structure is a circuit structure consisting of two inductors and two capacitors, and a specific connection relationship needs to depend on an actual case.

The first receiving subbranch 410 further includes a second compensation branch 410c connected to both the first boost branch 410a and the receiving coil 401 connected to the first receiving subbranch. The second compensation branch 410c is configured to: remove a direct current component from a second alternating current that is input by the receiving coil connected to the first receiving subbranch, and output, to the first boost branch, the second alternating current from which the direct current component is removed.

The second receiving subbranch 411 further includes a third compensation branch 411c connected to both the second boost branch 411a and the receiving coil 401 connected to the second receiving subbranch. The third compensation branch 411c is configured to: remove a direct current component from a third alternating current that is input by the receiving coil connected to the second receiving subbranch, and output, to the second boost branch, the third alternating current from which the direct current component is removed.

For structures of the second compensation branch 410c and the third compensation branch 411c, refer to the description of the first compensation branch. Details are not described herein again.

Optionally, parameter values of all the receiving coils 401 in this embodiment of the present invention may be the same, that is, all the receiving coils 401 may be coupled to the sending coil 400 at a same coupling strength.

A parameter value of each receiving coil 401 is at least one of an inductance value and a resistance value of a parasitic resistance.

Specifically, that all the receiving coils 401 are coupled to the sending coil at a same coupling strength means that coil types of all the receiving coils 401 are the same, vertical distances between all the receiving coils 401 and the sending coil 400 are the same, and distances between each receiving coil 401 and two adjacent receiving coils of the receiving coil 401 are the same.

The coil type may be a coil shape, for example, a circular coil or a square coil. A coil type of each receiving coil 401 and a disposition location relationship between the receiving coil 401 and the sending coil 400 are limited, so that all the receiving coils 401 can be coupled to the sending coil 400 at the same coupling strength.

In conclusion, under the action of the first boost branch and/or the second boost branch, the balancing capability of the energy balancing circuit provided in this embodiment of the present invention can be improved without adjusting the input voltage.

In addition, the energy balancing circuit provided in this embodiment of the present invention has a simple control structure, low resource overheads, and a relatively small energy loss.

Figure 7:
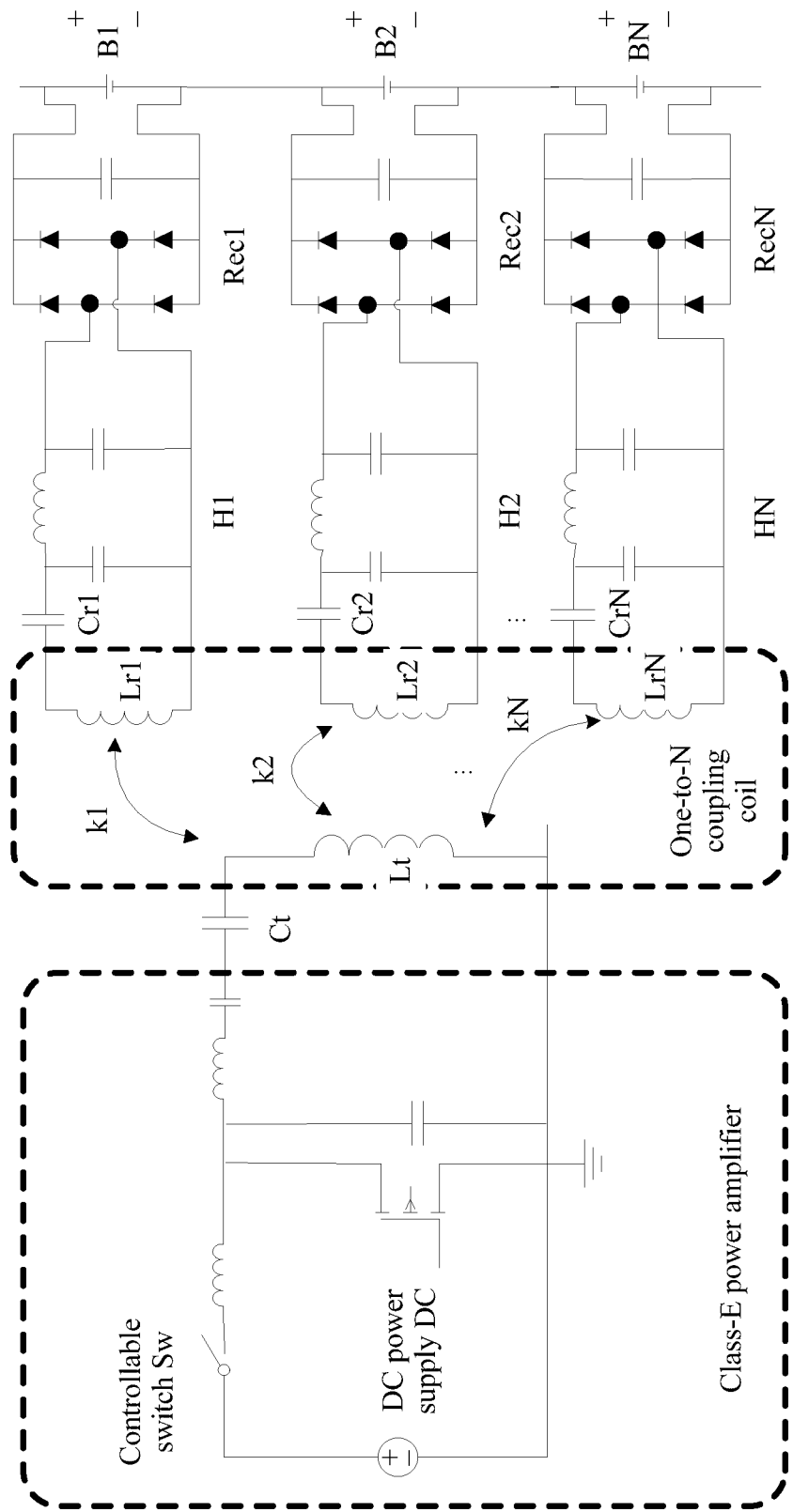
FIG. 7 is a sixth schematic structural diagram of an energy balancing circuit according to an embodiment of the present invention.

For clearer understanding of the technical solutions in the embodiments of the present invention, an energy balancing circuit shown in FIG. 7 is used as an example for description in an embodiment of the present invention.

As shown in FIG. 7, the energy balancing circuit includes a class-E power amplifier, a first coupling capacitor Ct, a one-to-N coupling coil (k1, k2, . . . , and kN respectively represent coupling strengths at which N receiving coils Lr1, Lr2, . . . , and LrN are coupled to a sending coil Lt), N second coupling capacitors (Cr1, Cr2, . . . , and CrN), N boost branches (H1, H2, . . . , and HN), N rectifiers (Rec1, Rec2, . . . , and RecN), and a battery pack (B1, B2, . . . , and BN).

The class-E power amplifier may be considered as a specific implementation of a controlled alternating current source and a power supply of the controlled alternating current source, and is configured to: generate a first alternating current, and output the generated first alternating current to the sending coil Lt by using the first coupling capacitor Ct.

The first coupling capacitor Ct may be considered as a specific implementation of a first compensation branch. The one-to-N coupling coil may be considered as a specific implementation of a coupling branch. The N second coupling capacitors may be considered as specific implementations of N second compensation branches. The N rectifiers may be considered as specific implementations of N rectifier branches. The battery pack may be considered as a specific implementation of a charging/discharging device group.

Specifically, in the class-E power amplifier shown in FIG. 7, Sw is a controllable switch of the entire circuit. When energy balancing does not need to be performed on the N batteries, the control switch Sw is opened. When energy balancing needs to be performed on the N batteries, the control switch Sw is closed.

The sending coil Lt sends an electromagnetic wave generated by using the input first alternating current to the N receiving coils Lr1, Lr2, . . . , and LrN. When parameter values of the N receiving coils Lr1, Lr2, . . . , and LrN are the same, and the N receiving coils Lr1, Lr2, . . . , and LrN are coupled to the sending coil Lt at a same coupling strength, the N receiving coils Lr1, Lr2, . . . , and LrN each receive the electromagnetic wave transmitted by the sending coil Lt, generate a second alternating current based on the received electromagnetic wave, and output the second alternating current to the N boost branches H1, H2, . . . , and HN. The N boost branches H1, H2, . . . , and HN each output the second alternating current to the N rectifiers Rec1, Rec2, . . . , and RecN. The N rectifiers Rec1, Rec2, . . . , and RecN each convert the second alternating current into a direct current, and then output the direct current, to respectively charge the N batteries B1, B2, . . . , and BN. If there is an energy difference between any two batteries in a process in which the N batteries B1, B2, . . . , and BN are charged, under the action of boost branches respectively corresponding to the two batteries, a balancing capability of the entire circuit can be improved without adjusting an output voltage of the class-E power amplifier, so that energy of the N batteries B1, B2, . . . , and BN can be quickly balanced.

An embodiment of the present invention further provides an energy balancing apparatus, and the energy balancing apparatus includes the energy balancing circuit shown in any one of FIG. 2 to FIG. 6. A balancing capability of the energy balancing circuit can be improved while a loss of the circuit is kept stable. Therefore, for the energy balancing apparatus, the balancing capability of the circuit can also be improved while the loss of the circuit is kept stable.

With descriptions of the foregoing implementations, a person skilled in the art may clearly understand that, for the purpose of convenient and brief description, division of the foregoing function modules is only used as an example for description. In actual application, the foregoing functions can be allocated to different function modules for implementation as required, that is, an inner structure of an apparatus is divided into different function modules to implement all or some of the functions described above.

In the several embodiments provided in the present invention, it should be understood that the disclosed system and apparatus may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the embodiments.

In addition, function units in the embodiments of the present invention may be integrated into one processing unit, or each of the units may exist alone physically, or two or more units are integrated into one unit. The integrated unit may be implemented in a form of hardware, or may be implemented in a form of a software function unit.

The descriptions are only specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An energy balancing circuit, the energy balancing circuit comprising a coupling branch and a receiving branch connected to the coupling branch, wherein the coupling branch comprises one sending coil and at least one receiving coil, wherein each of the at least one receiving coil is coupled to the sending coil in an electromagnetic induction manner, wherein the receiving branch comprises at least one receiving subbranch, wherein each receiving coil is uniquely connected to one of the at least one receiving subbranch, wherein each of the at least one receiving subbranch comprises a rectifier branch, wherein a first receiving subbranch in the at least one receiving subbranch comprises a first boost branch connected to both a first rectifier branch and a first receiving coil, wherein the first rectifier branch is a rectifier branch in the first receiving subbranch, and wherein the first receiving coil is a receiving coil connected to the first receiving subbranch,
wherein the first boost branch is configured to increase a first value when there is an energy difference between a first charging/discharging device connected to the first rectifier branch and a second charging/discharging device connected to a second rectifier branch, wherein the second rectifier branch is a rectifier branch in a second receiving subbranch, wherein the second receiving subbranch is any receiving subbranch other than the first receiving subbranch in the at least one receiving subbranch, wherein the first value is a ratio of a first impedance difference to a first terminal voltage difference, wherein the first impedance difference is a difference between an impedance of the first receiving subbranch and an impedance of the second receiving subbranch, and wherein the first terminal voltage difference is a difference between an terminal voltage of the first charging/discharging device and an terminal voltage of the second charging/discharging device.

2. The energy balancing circuit according to claim 1, wherein:
the second receiving subbranch further comprises a second boost branch connected to the second rectifier branch and a second receiving coil, wherein the second receiving coil is a receiving coil connected to the second receiving subbranch; and
the second boost branch is configured to increase a second value when there is an energy difference between the second charging/discharging device and a third charging/discharging device connected to a third rectifier branch, wherein the third rectifier branch is a rectifier branch in a third receiving subbranch, wherein the third receiving subbranch is any receiving subbranch other than the second receiving subbranch in the at least one receiving subbranch, wherein the second value is a ratio of a second impedance difference to a second terminal voltage difference, wherein the second impedance difference is a difference between the impedance of the second receiving subbranch and an impedance of the third receiving subbranch, and wherein the second terminal voltage difference is a difference between the terminal voltage of the second charging/discharging device and an terminal voltage of the third charging/discharging device.

3. The energy balancing circuit according to claim 1, wherein the energy balancing circuit further comprises a charging/discharging device group connected to the receiving branch, wherein the charging/discharging device group comprises at least one charging/discharging device connected in series, and wherein each of the at least one charging/discharging device is connected to one of the at least one receiving subbranch; and
wherein each charging/discharging device is configured to input a direct current that is output by a receiving subbranch connected to the charging/discharging device.

4. The energy balancing circuit according to claim 1, wherein the energy balancing circuit further comprises a controlled alternating current source connected to the sending coil; and wherein the controlled alternating current source is configured to generate and output a first alternating current.

5. The energy balancing circuit according to claim 4, wherein the energy balancing circuit further comprises a first compensation branch connected to both the controlled alternating current source and the sending coil; and
wherein the first compensation branch is configured to:
input the first alternating current that is output by the controlled alternating current source;
remove a direct current component from the first alternating current; and
output, to the sending coil, the first alternating current from which the direct current component is removed.

6. The energy balancing circuit according to claim 1, wherein:
the first receiving subbranch further comprises a second compensation branch connected to both the first boost branch and the first receiving coil; and
the second compensation branch is configured to:
remove a direct current component from a second alternating current that is input by the receiving coil connected to the first receiving subbranch; and
output, to the first boost branch, the second alternating current from which the direct current component is removed.

7. The energy balancing circuit according to claim 2, wherein:
the second receiving subbranch further comprises a third compensation branch connected to both the second boost branch and the second receiving coil; and
the third compensation branch is configured to:
remove a direct current component from a third alternating current that is input by the receiving coil connected to the second receiving subbranch; and
output, to the second boost branch, the third alternating current from which the direct current component is removed.

8. The energy balancing circuit according to claim 1, wherein parameter values of all the receiving coils are the same, wherein all the receiving coils are coupled to the sending coil at a same coupling strength.

9. The energy balancing circuit according to claim 8, wherein a parameter value of each receiving coil is at least one of an inductance value or a resistance value of a parasitic resistance.

10. The energy balancing circuit according to claim 8, wherein:
all the receiving coils are coupled to the sending coil at a same coupling strength means that coil types of all the receiving coils are the same;
vertical distances between all the receiving coils and the sending coil are the same; and
distances between each receiving coil and two adjacent receiving coils of the receiving coil are the same.

* * * * *